United States Patent Office 2,969,416
Patented Jan. 24, 1961

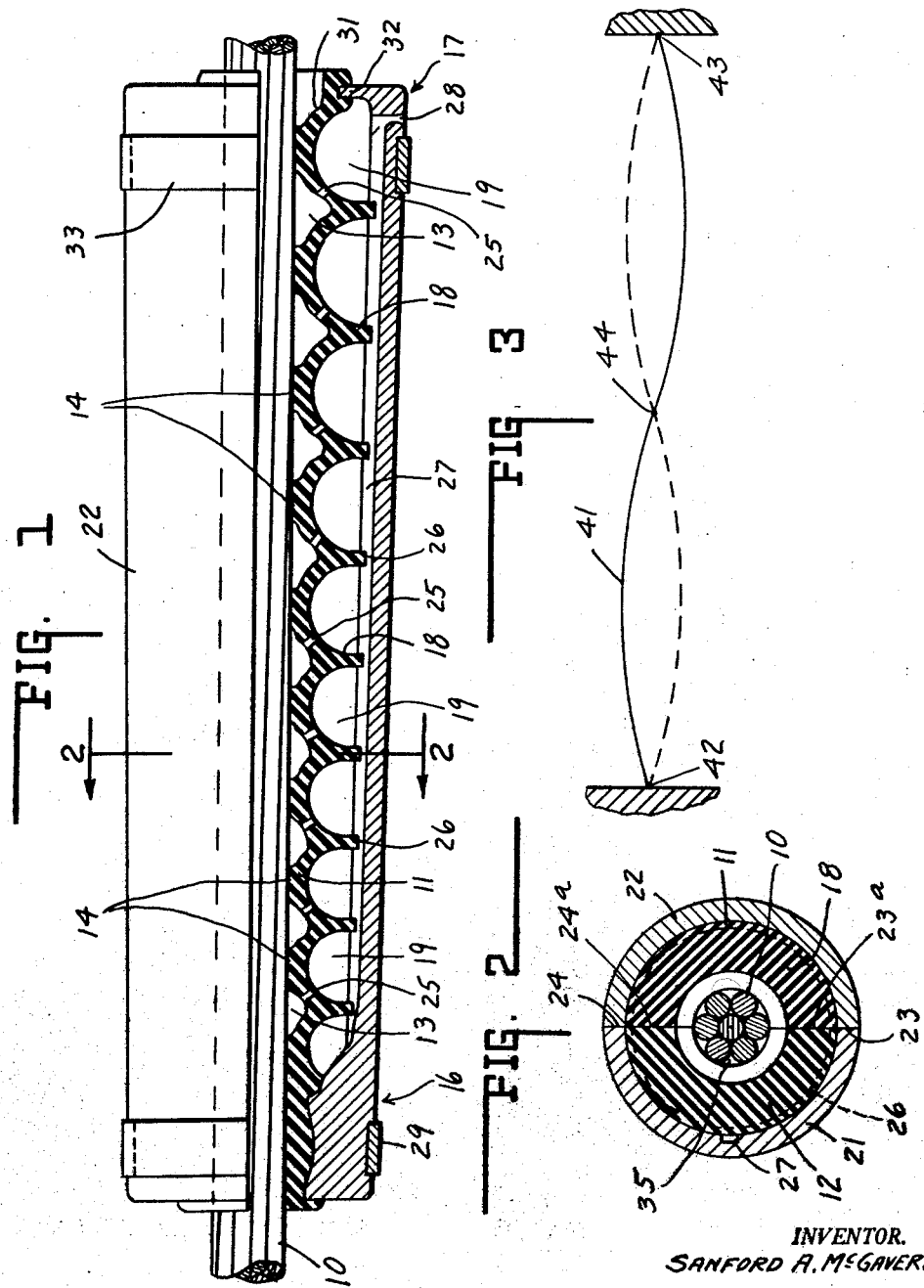

2,969,416
CABLE VIBRATION DAMPER

Sanford A. McGavern, Indianapolis, Ind., assignor to Schwitzer Corporation, Indianapolis, Ind., a corporation Filed Aug. 26, 1959, Ser. No. 836,242

4 Claims. (Cl. 174—42)

This invention relates generally to motion or vibration dampers for cable, wire or the like and in particular to a wave suppressing type damper for use on electrical transmission line cables or the like.

The present invention relates to a vibration damper for a cable or wire supported under tension between two fixed supports. The damper of the present invention may, for example, be utilized on power transmission lines suspended from spaced towers. In such applications, the portion of the cable between supporting towers normally hangs in a catenary curve and is subject to undesirable motion or vibration caused by wind, sleet or the like.

One type of wind induced motion or vibration exists when the cable is subjected to steady winds, the vibrations varying with wind speed, cable weight and cable tension. Average vibration frequency ranges between ten to one hundred cycles per second, and distances between node points may vary from one and one-half to twenty-five feet. The cable motion referred to above, if unchecked and permitted to reach the cable support points, causes the cable to flex back and forth through a zero position at the support point thereby inducing fatigue in the cable metal. The more frequent use of aluminum cables has increased the need for minimizing this flexing. If the vibrations are permitted to enter the support points, they will be transmitted to the supporting structure such as a tower and may fatigue the tower, generate tower element resonance, and shake loose nuts, bolts, rivets and the like. Aside from the effects just mentioned, if the vibrations are unchecked, their amplitude may increase or build up should conditions of resonance occur.

The damper element of the present invention is adapted for installation on a line such as an electrical power transmission cable, the element extending over a length of the cable as distinguished from being supported thereon at a single point. This extension of the element over an appreciable length of the cable renders its location on the cable less critical in that the damping effect of the element cannot be eliminated by the occurrence of a vibration node point on the cable in a section enclosed by the element. The radial stiffness of the assembled element varies from one end to the other and the element, upon installation, has its stiff end oriented so as to be nearer to a support than is the soft end. Thus, as motion is generated near the center of a cable span and approaches the supported ends of the cable as a wave, it will enter the soft end of the damper and will be subjected to a damping or suppressing action. The energy of the wave will be substantially dissipated by several energy absorbing reactions before it can emerge from the stiff end of the damper element, or reflect back toward the span center.

It is the primary object of the present invention to provide a means to suppress or dampen vibrations and other externally excited cyclical motions which extend or traverse along the length of supported wires or cables.

A further object of the present invention is to provide a damping element utilizing the summation of several energy absorbing reactions to suppress wire or cable motion.

A further object of the present invention is to provide a damping element of the type referred to in which the elastic component is protected from exposure and aging deterioration, such as ozone attack.

A further object of the present invention is to provide a damping element having provision for drainage of condensate or rain water.

A further object of the present invention is to provide a damping element for high voltage power transmission lines which has rounded corners and a generally smooth outer configuration to reduce corona discharge.

A further object of the present invention is to provide a damping element for use on cables or wires supported at spaced points, the characteristics of the damping element being such that precise location of the element on the cable is not critical in achieving maximum motion damping.

The full nature of the invention will be understood from the accompanying drawings and the following description and claims:

Fig. 1 is a side view, partially in section of the damping assembly installed upon a cable.

Fig. 2 is a sectional view taken generally along the line 2—2 of Fig. 1.

Fig. 3 is a schematic view illustrating the wave form assumed by the cable under certain conditions.

Referring initially to Figs. 1 and 2, there is shown a section of stranded cable indicated at 10. Enclosing the cable is an elastic element having a generally tubular configuration and formed of a flexible resilient material, such as rubber or the like. The elastic element is composed of two opposed sections 11 and 12, each being generally semicircular in cross sectional configuration, as indicated in Fig. 2. Along the internal bore of the elastic element are formed internal annular cavities 13. The cavities are separated by sections 14 which engage the cable. As will be evident from Fig. 1, the internal cavities are of increasing volume and spacing from one end 16 of the assembly to the other end 17.

The outer surfaces of the elastic element sections are provided with radially extending flanges 18, the flanges carried by the section 11 being aligned with the flanges carried by the section 12. The distance of the flange edges from the axis of the cable increases from the end 16 of the assembly to the end 17 thereof as may be seen in Fig. 1. Further, the spacing between the flanges 18 increases from the end 16 to the end 17 of the assembly. The flanges thus define exterior annular cavities 19 of graduated volume. Air valving apertures 25 are formed in the elastic element sections and provide communication between the cavities 13 and the exterior cavities 19.

A generally tubular, rigid sheath encloses the elastic element and is formed from two symmetrical opposed sections 21 and 22. The sections are formed by casting or machining from a metal having appreciable mass. The opposed edges of the sheath sections, indicated at 23 and 24 in Fig. 2, are aligned with the opposed edges, indicated at 23a and 24a in Fig. 2 of the elastic element sections.

As may be seen in Fig. 1, the inner surface of the sheath is provided with spaced, annular grooves 26 which receive the end portions of the flanges 18, the flanges being mechanically held or cemented into the grooves. The sheath section 21, which on the horizontal cable is the lower section, is provided with an axial weep trough or groove indicated at 27. The groove extends along substantially the entire length of the sheath section and communicates with a weep hole or aperture 28 through the sheath section.

Adjacent the end 16 of the assembly the elastic element sections are formed so as to be compressed by the thickened side wall of the sheath sections. Various means may be provided for tightly clamping the sheath sections against the elastic element, for example, the sheath sections might be provided with external flanges through which bolts may extend. As herein disclosed the sheath is tightened rigidly on the cable at the end 16 of the assembly by means of a conventional metal band clamp indicated at 29. At the opposite end 17 of the assembly the elastic element sections are formed with an extending flange 31 which is grooved to receive the inwardly extending flange 32 formed on the sheath. A band clamp 33, similar to the clamp 29, encircles the sheath. It may thus be seen that the assembly is of decreasing radial stiffness from the end 16 to the end 17 thereof.

The assembly is installed on a cable supported by towers or poles. The precise placement of the assembly has considerable latitude, however, the end 16 must be disposed closer to a support point than the end 17 of the assembly.

In operation, as the vibrating wave enters the soft end 17 of the assembly it is progressively damped as it moves through the assembly, so that its energy is dissipated and transmission of the wave to the tower or pole is halted. Reflection of the wave toward the span center is likewise halted. Several factors provide the damping action. The internal friction in the elastic element and the friction of the elastic element against the cable wire tend to dissipate the kinetic energy in frictionally generated heat. Since the sections of the elastic element and the sheath below the cable are not connected to that part of the assembly above the cable, when the cable moves upwardly, for example, placing the upper elastic element section 11 in compression, the lower elastic element section 12 is not correspondingly placed in tension. As the cable vibrates, therefore, the force resisting such motion is not of pure sinusoidal form. Under cable motion of relatively large amplitude, air is pumped back and forth between the inner cavities 13 and the outer cavities 19 through the apertures 25, this also creating an energy absorbing action. A second air movement, having similar energy absorbing characteristics, can occur through the weep trough or groove 27, as well as along the space between the cable strands and the elastic element, such space being indicated at 35 in Fig. 2. The flange 32 at end 17 of the assembly provides a positive mechanical bumper which serves to attenuate large swings of the cable.

Prior art dampers are suspended at what is, in effect, a single point on the cable. This arrangement has its disadvantages as will be apparent from Fig. 3. In Fig. 3, the support points or nodes for the cable 14 are indicated at 42 and 43. The cable is shown vibrating in a wave form with the node occurring at 44. The distance between the node points, as previously mentioned, may vary from one and one-half to twenty-five feet because of varying wind conditions and the like. Since these node points are apt to occur almost anywhere along the length of the cable and because a damping device supported at these points would be ineffective, the placement of single point support dampers is quite critical and the dampers may be under some conditions ineffective. The assembly of the present invention, since it extends along a length of the cable, avoids this difficulty. Extension of the assembly is such that no matter where a node point occurs on the cable, at least a portion of the damper assembly will be effective.

It should be further noted that the general design of the assembly is such as to provide round corners and a smooth outer configuration, thereby reducing corona discharge when the damper is utilized on high voltage power transmission lines. The sheath provides protection of the elastic element against aging effects, including ozone attack, and thus prolongs the useful life of the assembly. The provision for drainage of condensate and rain water also tends to prolong the service life of the assembly. While the invention has been described as applied to a stranded cable, it will be obvious that it could likewise be applied to a single wire and on any application wherein a wire or cable is strung between supports and is under tension.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. An assembly for damping vibration in a cable or the like supported at spaced points, said assembly including an elastic element having a tubular configuration adapted to enclose a length of the cable, said elastic element being formed of a flexible, resilient material such as rubber and comprising two opposed sections each generally semi-circular in cross-sectional configuration, spaced, internal, annular cavities formed in said elastic element along its bore, said cavities being of increasing volume and spacing from one end of said elastic element to the other, spaced annular flanges formed on the exterior of said elastic element, said flanges being of increasing width and spacing from said one end of the elastic element to said other end thereby defining exterior cavities of graduated volume, apertures in said elastic element joining adjacent exterior and interior cavities, and a generally tubular rigid sheath having appreciable mass enclosing said elastic element, said sheath comprising two opposed sections each generally semi-circular in cross-sectional configuration, the abutting edges of said sheath sections being aligned with the opposed edges of said elastic element sections, one of said sheath sections having an axial groove therein communicating with an aperture in said sheath to permit drainage of moisture from the interior of said sheath, means for clamping said one end of said sheath tightly upon the cable with the adjacent portion of said elastic element under radial compression, means for clamping said other end of the sheath on the cable without placing said elastic element under appreciable radial compression whereby with said assembly oriented on the cable so that said one end is nearer than said other end to a cable support point, cable vibration waves may enter said other end of the assembly and are absorbed by the internal friction inherent in said elastic element, the friction between said element and the cable and, for vibration of relatively large amplitude, by transferring air between said inner and outer cavities through said apertures and between said outer cavities through said groove.

2. An assembly for damping vibration in a cable or the like supported at spaced points, said assembly including an elastic element having a tubular configuration adapted to enclose a length of the cable, said elastic element being formed of a flexible, resilient material such as rubber and comprising two opposed sections each generally semi-circular in cross-sectional configuration, spaced, internal, annular cavities formed in said elastic element along its bore, said cavities being of increasing volume and spacing from one end of said elastic element to the other, spaced annular flanges formed on the exterior of said elastic element, said flanges being of increasing width and spacing from said one end of the elastic element to said other end thereby defining exterior cavities of graduated volume, apertures in said elastic element joining adjacent exterior and interior cavities, and a generally tubular rigid sheath having appreciable mass enclosing said elastic element, said sheath comprising two opposed sections each generally semi-circular in cross-sectional configuration, the abutting edges of said sheath sections being aligned with the opposed edges of said elastic element sections, means for clamping said one end of said sheath tightly upon the cable with the adjacent portion of said elastic element under radial compression, means for clamping said other end of the sheath on the cable without placing said elastic element under appreciable radial compression whereby with said assembly oriented on the cable so that said one end is nearer than said other end to a cable support point, cable vibration waves may enter said other end of the assembly and are absorbed by the internal friction inherent in said elastic element, the friction between said element and the cable and, for vibration of relatively large amplitude, by transferring air between said inner and outer cavities through said apertures.

3. An assembly for damping vibration in a cable or the like supported at spaced points, said assembly including an elastic element having a tubular configuration adapted to enclose a length of the cable, said elastic element being formed of a flexible, resilient material such as rubber and comprising two opposed sections each generally semi-circular in cross-sectional configuration, spaced annular flanges formed on the exterior of said elastic element, said flanges being of increasing width and spacing from said one end of the elastic element to said other whereby said element is provided with graduated radial stiffness, and a generally tubular rigid sheath having appreciable mass enclosing said elastic element, said sheath comprising two opposed sections each generally semi-circular in cross-sectional configuration, the abutting edges of said sheath sections being aligned with the opposed edges of said elastic element sections, means for clamping said one end of said sheath tightly upon the cable with the adjacent portion of said elastic element under radial compression, means for clamping said other end of the sheath on the cable without placing said elastic element under appreciable radial compression whereby with said assembly oriented on the cable so that said one end is nearer than said other end to a cable support point cable vibration waves may enter said other end of the assembly and are absorbed by the internal friction inherent in said elastic element and the friction between said element and the cable.

4. An assembly for damping vibration in a cable or the like supported at spaced points, said assembly including an elastic element having a tubular configuration adapted to enclose a length of the cable, said elastic element being formed of a flexible, resilient material such as rubber and comprising two opposed sections each generally semi-circular in cross-sectional configuration, spaced, internal, annular cavities formed in said elastic element along its bore, said cavities being of increasing volume and spacing from one end of said elastic element to the other whereby said element is provided with graduated radial stiffness, and a generally tubular rigid sheath having appreciable mass enclosing said elastic element, said sheath comprising two opposed sections each generally semi-circular in cross-sectional configuration, the abutting edges of said sheath sections being aligned with the opposed edges of said elastic element sections, means for clamping said one end of said sheath tightly upon the cable with the adjacent portion of said elastic element under radial compression, means for clamping said other end of the sheath on the cable without placing said elastic element under appreciable radial compression whereby with said assembly oriented on the cable so that said one end is nearer than said other end to a cable support point cable vibration waves may enter said other end of the assembly and are absorbed by the internal friction inherent in said elastic element and the friction between said element and the cable.

References Cited in the file of this patent

UNITED STATES PATENTS

| 1,671,659 | Varney | May 29, 1928 |
| 1,884,036 | Malone | Oct. 25, 1932 |
| 1,898,677 | Malone | Feb. 21, 1933 |
| 1,902,009 | Austin | Mar. 21, 1933 |

FOREIGN PATENTS

| 331,220 | Italy | Oct. 31, 1935 |